Figure 1:
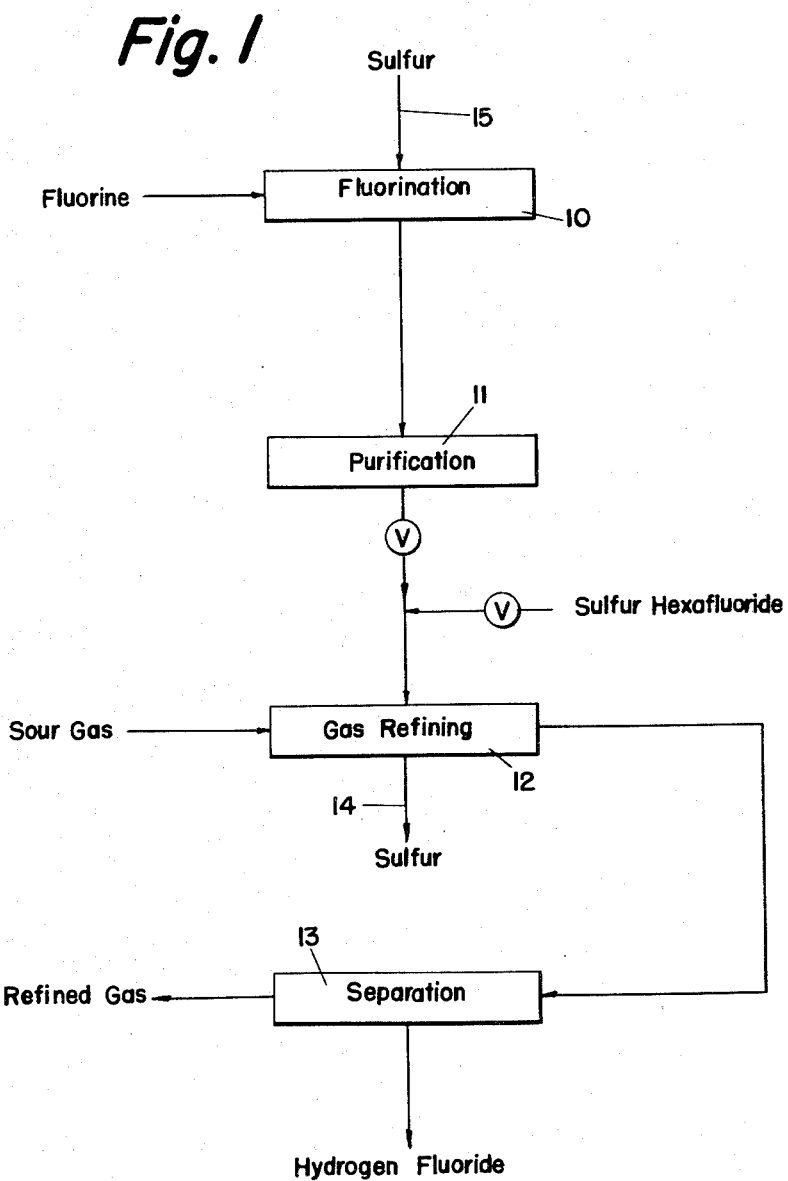

United States Patent Office 2,984,615
Patented May 16, 1961

2,984,615
REMOVING HYDROGEN SULFIDE FROM HYDROGEN RECYCLE IN HYDROFORMING PROCESS

Lawrence N. Jacob, Toledo, Ohio, assignor to Sun Oil Company, Philadelphia, Pa., a corporation of New Jersey Filed Nov. 4, 1957, Ser. No. 694,189
2 Claims. (Cl. 208—78)

This invention relates to removing hydrogen sulfide from other materials, including normally liquid and normally gaseous materials.

It is frequently desired in industrial operations to remove hydrogen sulfide from normally liquid or normally gaseous materials, in order to eliminate disposal problems with regard to the hydrogen sulfide, or to avoid undesirable effects of hydrogen sulfide in operations to which the materials are subsequently subjected. The present invention provides a novel manner of removing hydrogen sulfide, whereby hydrogen fluoride and sulfur are produced in the reaction which eliminates the hydrogen sulfide, the hydrogen fluoride and sulfur which are produced constituting valuable products of the process.

In certain embodiments of the invention, the hydrogen fluoride which is produced is subsequently employed to produce some beneficial effect in the material from which the hydrogen sulfide is removed. This effect may be a refining action, removing additional undesirable constituents from the material, or it may be a catalytic action whereby the material from which hydrogen sulfide has been removed is converted to a more valuable form.

In another embodiment of the invention, the hydrogen fluoride which is produced is separated from the material from which hydrogen sulfide has been removed, and the separated hydrogen fluoride can then be used for any desired purpose such as alkylation agent, desulfurizing agent, selective solvent or precipitant for asphalt.

The process according to the invention involves contacting normally liquid or gaseous material containing hydrogen sulfide with sulfur hexafluoride ($SF_6$), thereby to react the hydrogen sulfide in the material with sulfur hexafluoride to form hydrogen fluoride and elemental sulfur according to the following equation:

$$SF_6 + 3H_2S \rightarrow 6HF + 4S$$

The sulfur which is produced in the reaction constitutes an additional valuable product, and can be employed in any suitable manner. If desired, the sulfur can be reacted with fluorine by known methods to form sulfur hexafluoride for additional use according to the invention.

The reaction of hydrogen sulfide with sulfur hexafluoride can be performed at any suitable temperature, e.g. room temperature to 500° F. Preferred temperatures are those within the approximate range from 150° F. to 300° F. Usually both reactants are in the vapor phase during the reaction, although it is within the scope of the invention to perform the reaction with the hydrogen sulfide dissolved in a liquid material, e.g. hydrocarbons, water, etc. Usually it will be desirable to perform the reaction at atmospheric pressure, though higher pressures, e.g. up to 500 p.s.i.g. or above, can be employed if desired. Preferably, approximately stoichiometric proportions of sulfur hexafluoride and $H_2S$ are employed, though greater than stoichiometric amounts of the hexafluoride can be employed if desired.

Figure 2:
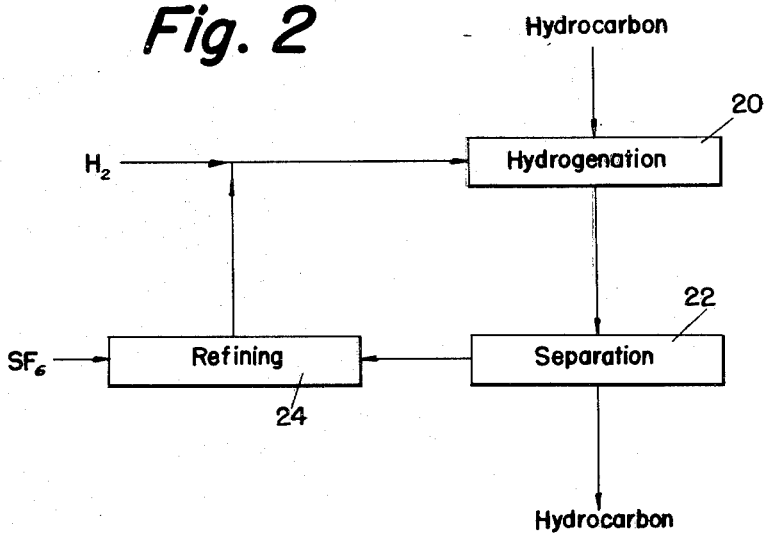
Figure 3:
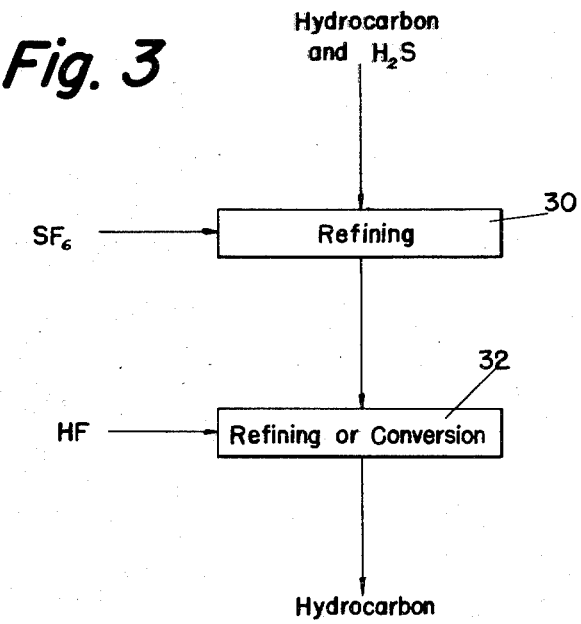

The invention will be further described with reference to the attached drawings, in which Figure 1 illustrates one embodiment of the $SF_6$ contacting according to the invention, Figure 2 illustrates such contacting in combination with a hydrogenation process, and Figure 3 illustrates such contacting in combination with a subsequent refining or conversion process.

Sulfur and fluoride are introduced into fluorination zone 10 in Figure 1 and reacted therein under suitable known conditions to form sulfur hexafluoride. Processes for such conversion are well known in the art, and any suitable method can be employed. Thus for example the procedure disclosed by W. C. Schumb et al. in "Industrial and Engineering Chemistry," volume 39, pages 421 to 423 (1947), can be employed.

The sulfur hexafluoride and other reaction products are then introduced into purification zone 11, wherein they are subjected to known methods for purification of sulfur hexafluoride. Such methods include heat treatment, e.g. at 250° C. to 400° C., to convert $S_2F_{10}$ to $SF_6$ and lower fluorides of sulfur, washing with aqueous alkali to remove lower fluorides of sulfur, etc. Such procedure is disclosed in the Schumb article referred to previously.

The purified sulfur hexafluoride is then introduced into gas refining zone 12, wherein it is contacted with sour gas containing hydrogen sulfide in order to refine the latter. The hydrogen sulfide in the sour gas reacts with sulfur hexafluoride to form elemental sulfur and hydrogen fluoride. The elemental sulfur is separated from other constituents of the product mixture and removed through line 14. This sulfur can be recycled to the fluorination step through line 15 if desired.

Any suitable manner of removing elemental sulfur from the product gases can be employed. For example, the gases can be passed upwardly through a body of molten sulfur in order to scrub sulfur from the gases. Any other suitable method for sulfur removal can be employed.

The product gases are then introduced into separation zone 13, wherein hydrogen fluoride is separated from the refined gas. This separation can be accomplished for example by fractionally liquefying the hydrogen fluoride, as by reduction of temperature, increase of pressure, etc., and separating the fixed gases from the liquefied hydrogen fluoride. Any other suitable manner of separating hydrogen fluoride can be employed, such as water washing or dilute caustic (alkali) washing, and the separated hydrogen fluoride can be subsequently employed for any known use of this material.

The reaction of hydrogen sulfide with sulfur hexafluoride in zone 12 is generally quite complete. However, if the product gases contain any substantial amount of unreacted sulfur hexafluoride, the latter can be separated from the other constituents of the product gases in any suitable manner, e. g. by fractional diffusion.

Examples of materials from which hydrogen sulfide is removed according to the invention are hydrogen, carbon dioxide and hydrocarbons. These materials are essentially unreactive with sulfur hexafluoride, so that they are not chemically affected during the operation in which hydrogen sulfide reacts with sulfur hexafluoride. The material from which hydrogen sulfide is removed may comprise a mixture of constituents including one or more of the above materials, and possibly also containing other constituents normally present in materials from which it is desired to remove hydrogen sulfide.

In one embodiment of the process according to the invention, as illustrated in Figure 2, a process for hydrogenation of hydrocarbons is provided. In this embodiment, hydrocarbons containing sulfur compounds are contacted in zone 20 with hydrogen and a hydrogenation catalyst under hydrogenation conditions, thereby to form hydrogen sulfide. This hydrogen sulfide and excess hydrogen are separated in zone 22 from the products and contacted in zone 24 with sulfur hexafluoride, thereby to form hydrogen fluoride and elemental sulfur. The elemental sulfur is separated by means not shown from the hydrogen fluoride and hydrogen, and the latter are contacted with hydrocarbons and a hydrogenation catalyst under hydrogenation conditions, e.g. by recycling to the original hydrogenation zone. The hydrogen fluoride promotes the hydrogenation reaction. Thus the operation is advantageous in that a separation of hydrogen sulfide from hydrogen is obtained, thereby rendering the hydrogen suitable for re-use in the hydrogenation operation, and at the same time hydrogen fluoride is produced which has a beneficial effect in the hydrogenation in which the hydrogen is re-used.

In this embodiment any suitable hydrogenation catalyst can be employed. Examples of such catalysts are metals such as nickel, cobalt, molybdenum, chromium, tungsten, vanadium, iron etc. oxides or sulfides thereof, or mixtures of such metals, oxides or sulfides. Any suitable carrier for the hydrogenation catalyst can be employed, e.g. silica gel, bauxite, alumina, kieselguhr, clay, pumice etc. Any suitable hydrogenation conditions can be employed e.g. temperatures within the approximate range from 600° F. to 900° F., pressures within the approximate range from atmospheric pressure to 5000 p.s.i.g., etc.

Charge stocks which can advantageously be hydrogenated according to this embodiment of the invention are primarily the heavier fractions, such as crude oil, distillation residues, heavy distillates, etc. The hydrogen fluoride which is employed promotes hydrocracking operations which result in the formation of products having lower molecular weight than the charge stock. Although the hydrogenation is preferably performed on a relatively high boiling charge stock, it is within the scope of the invention to employ lower boiling charge stocks also.

In another embodiment of the invention, operation similar to that described with respect to hydrogenation is performed in a catalytic reforming process, wherein hydrogen and hydrogen sulfide are separated from the refined products and the hydrogen re-used in reforming operations. The hydrogen sulfide can be converted to hydrogen fluoride in the manner previously described, and the latter introduced together with the hydrogen into the reforming operation. The hydrogen fluoride produces beneficial hydrocracking effects in the reforming process.

In this embodiment, any suitable reforming catalyst and conditions can be employed, such catalyst and conditions being generally well known in the art. The platinum-containing catalysts are preferred.

In another embodiment, the invention involves the refining of hydrocarbons which contain hydrogen sulfide and also undesirable materials which are removable by treating with hydrogen fluoride. In this embodiment, as illustrated in Figure 3, the hydrocarbons are first contacted in zone 30 with sulfur hexafluoride to convert the hydrogen sulfide into hydrogen fluoride, and the hydrocarbons are subsequently contacted in zone 32 with the resulting hydrogen fluoride in order to provide a beneficial refining action by the latter. Generally it will be necessary to add, as shown, hydrogen fluoride from an external source in order to provide sufficient amount of hydrogen fluoride relative to hydrocarbons. This type of operation is applicable generally to any of the well known processes for refining hydrocarbons by means of hydrogen fluoride, wherein the hydrocarbons contain hydrogen sulfide. The elemental sulfur which is formed can be separated from the treated hydrocarbons in any suitable known manner for such removal.

In another embodiment, also illustrated in Figure 3, hydrocarbons which contain hydrogen sulfide and constituents convertible by hydrogen fluoride catalysts are contacted with sulfur hexafluoride thereby to form hydrogen fluoride and elemental sulfur. The hydrocarbons separated from elemental sulfur by a suitable known manner, are subjected to conversion conditions wherein the hydrogen fluoride catalyzes the desired conversion. Such processes include HF-catalyzed alkylation of isoparaffins and olefins, e.g. isobutane and isobutylene; polymerization of olefins such as isobutylene, etc.

The following examples illustrate the invention:

Example I

Operation generally as illustrated in Figure 1 of the drawing is performed. The sour gas contains about 54% hydrogen sulfide, 35% carbon dioxide, 3% methane and 8% water. The volume ratio of sulfur hexafluoride to hydrogen sulfide in zone 12 is about 1:3, and the temperature about 200° F. The product gases are passed upwardly through a body of molten sulfur in order to remove sulfur from the gases. Hydrogen fluoride is recovered from the effluent gases by cooling the latter to a temperature below the boiling point of hydrogen fluoride. Highly satisfactory yields of elemental sulfur and hydrogen fluoride are obtained, and the refined gases have satisfactorily low hydrogen sulfide content.

Example II

A topped Mid-Continent crude containing constituents boiling at 1000° F. and higher is contacted at 850° F. and 1500 p.s.i.g. with hydrogen and a granular solid hydrogenation catalyst comprising 12.5% cobalt molybdate on alumina. The contact is by percolation at a liquid hourly space velocity of 5 volumes per volume of catalyst bed per hour. Gases containing about one volume percent $H_2S$ are separated from the effluent oil and contacted at about 350° F. with one volume of sulfur hexafluoride per 3 volumes of $H_2S$. Elemental sulfur is separated from the product gases containing HF, which are then recycled to the hydrogenation zone. The HF promotes hydrocracking reactions in the hydrogenation zone.

Generally similar operation can be performed in a process where the hydrocarbon conversion which is involved is reforming of straight run naphtha with conventional platinum reforming catalyst at 850° F. and 700 p.s.i.g. and space velocity of 4 for example.

Example III

Cracked gasoline containing a small amount of $H_2S$ is contacted with one volume of $SF_6$ per 2 volumes of $H_2S$ in the gasoline by passing the latter through the gasoline at 150° F. The resulting gasoline containing HF and elemental sulfur is contacted at room temperature with one percent of added HF for 4 hours, then caustic washed to remove HF. The product has improved gum stability as a result of the HF treatment and is substantially free of $H_2S$.

Example IV

Isobutane and isobutene in the gaseous state containing a small amount of $H_2S$ are contacted with one volume of $SF_6$ per 3 volumes of hydrocarbon at 200° F. Elemental sulfur is separated from the gases containing HF. The isobutane and isobutene in a 10:1 volume ratio and now substantially free of $H_2S$ are then contacted with one volume of added liquid HF per volume of hydrocarbon at 100° F. and pressure sufficient to maintain HF and isobutane in liquid phase. Alkylate is separated from HF in the conventional manner.

The invention claimed is:

1. Process for destructive hydrogenation of hydrocarbons which comprises: contacting hydrocarbons containing sulfur compounds with hydrogen and a hydrogenation catalyst under hydrogenation conditions, thereby to form $H_2S$ and lower boiling hydrocarbons; separating $H_2S$ and hydrogen from the products; contacting the separated $H_2S$ and hydrogen with $SF_6$, thereby to form HF and elemental sulfur; separating elemental sulfur from HF and hydrogen; and contacting the separated HF and hydrogen with hydrocarbons and a hydrogenation catalyst under hydrogenation conditions; whereby the presence of the HF in the last-named contacting promotes hydrocracking reactions during said last-named contacting.

2. Process for reforming of hydrocarbons which comprises: contacting hydrocarbons containing sulfur compounds with hydrogen and a reforming catalyst under reforming conditions, thereby to form $H_2S$ and reformed hydrocarbons; separating $H_2S$ and hydrogen from the products; contacting the separated $H_2S$ and hydrogen with $SF_6$, thereby to form HF and elemental sulfur; separating elemental sulfur from HF and hydrogen; and contacting the separated HF and hydrogen with hydrocarbons and a reforming catalyst under reforming conditions; whereby the presence of the HF in the last-named contacting promotes hydrocracking reactions during said last-named contacting.

References Cited in the file of this patent

UNITED STATES PATENTS

| 2,135,922 | Terres et al. | Nov. 8, 1938 |
| 2,378,762 | Frey | June 19, 1945 |
| 2,417,308 | Lee | Mar. 11, 1947 |
| 2,760,905 | MacLaren | Aug. 28, 1956 |

OTHER REFERENCES

Mellor: "Comprehensive Treatise on Inorganic and Theoretical Chemistry," vol. 10, Longmans Green and Co., New York, 1930, page 630.